May 4, 1943.　　N. D. COLVIN ET AL　　2,318,202
TRACTOR MOWER
Filed Feb. 14, 1942　　4 Sheets-Sheet 1

INVENTORS
CARL J. FREDERIKSEN & NOLAN D. COLVIN
BY
ATTORNEYS

May 4, 1943.　　　N. D. COLVIN ET AL　　　2,318,202
TRACTOR MOWER
Filed Feb. 14, 1942　　　4 Sheets-Sheet 2

INVENTORS
CARL J. FREDERIKSEN & NOLAN D. COLVIN
BY
ATTORNEYS

INVENTORS
NOLAN D. COLVIN & CARL J. FREDERIKSEN
BY
ATTORNEYS

INVENTORS
NOLAN D. COLVIN & CARL J. FREDERIKSEN
ATTORNEYS

Patented May 4, 1943

2,318,202

UNITED STATES PATENT OFFICE 2,318,202

TRACTOR MOWER

Nolan D. Colvin and Carl J. Frederiksen, Moline, Ill., assignors to Deere & Company, Moline, Ill., a corporation of Illinois Application February 14, 1942, Serial No. 430,908

14 Claims. (Cl. 56—25)

The present invention relates generally to tractor mowers and more particularly to tractor mowers of the type having a cutter bar which is yieldable rearwardly when the latter strikes an obstruction in the field during operation. The principal object of our invention relates to the provision of a novel and simple but durable means for supporting a mower cutter bar on a tractor ahead of the rear wheels of the tractor to provide for maximum visibility of the cutting apparatus from the operator's station, and with provision for rearward yielding of the cutter bar when the latter encounters and obstacle during operation. Another object of our invention relates to the provision of a mower in which the mounting means for the cutter bar is pivotally supported on the body of the tractor at a sufficient distance from the mower shoe, so that when an obstruction encounters the shoe or the inner end of the cutter bar adjacent the shoe, there is a substantial rearward swinging movement not only of the outer end of the cutter bar but also of the shoe, thereby preventing damage to the parts of the mower structure. A more specific object has to do with the provision of a tractor mower in which the cutter bar is mounted on a frame which is pivoted to the tractor body and extends forwardly of the rear wheel of the tractor and is provided with a supporting wheel on the outer end of the frame. This type of mower is especially adaptable to the tricycle type of tractor in which the body is comparatively narrow, and thus does not provide a pair of mounting locations spaced laterally sufficiently for the pivot point and the latch connection, as compared with the structure disclosed in the Frederiksen Patent No. 2,240,292. Another object of our invention, therefore, is concerned with the provision of a mower for a tricycle type tractor having a long narrow body, with a mower frame in which the pivot mounting and the latch connection are longitudinally aligned approximately in the center of the tractor frame.

These and other objects and advantages of our invention will be apparent to those skilled in the art after a consideration of the following description, in which reference is had to the drawings appended hereto, in which.

Figure 1:
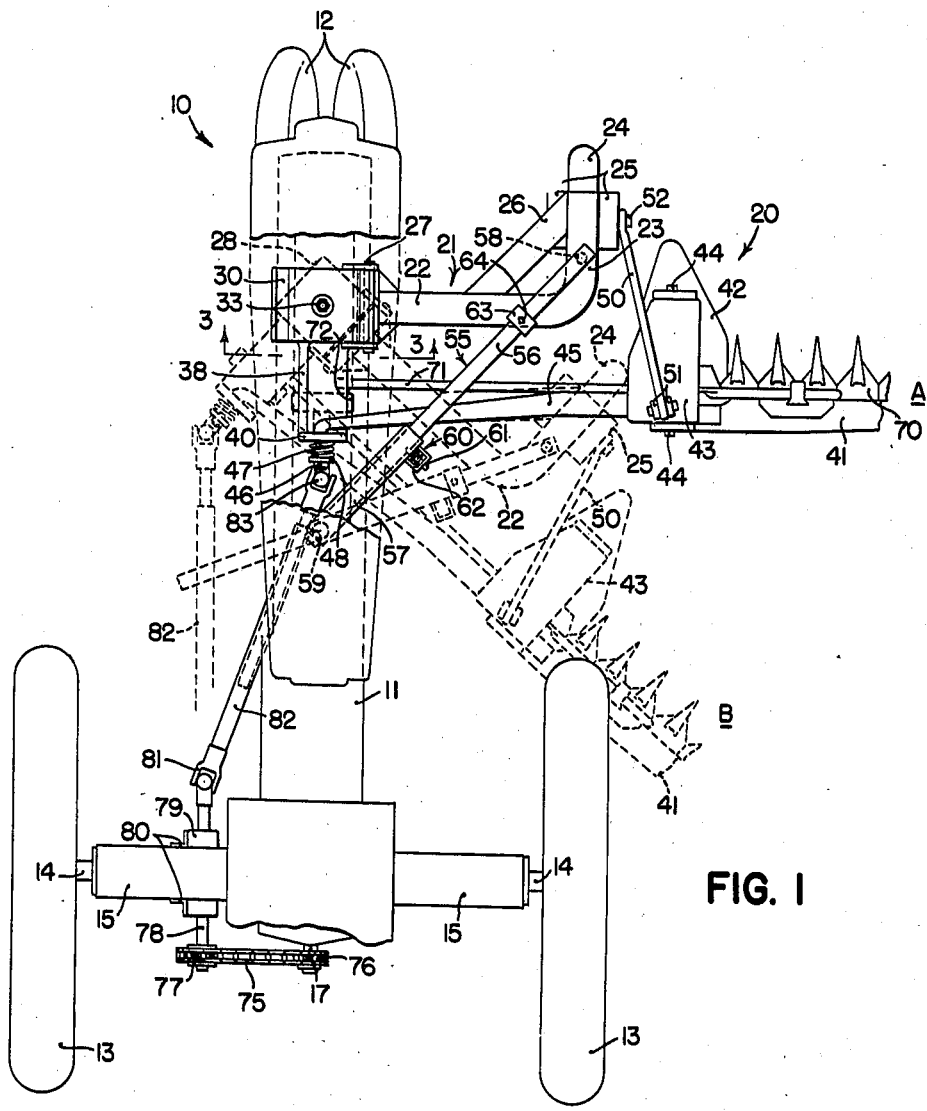
Figure 1 is a plan view of a tractor mower embodying the principles of the present invention.
Figure 2:
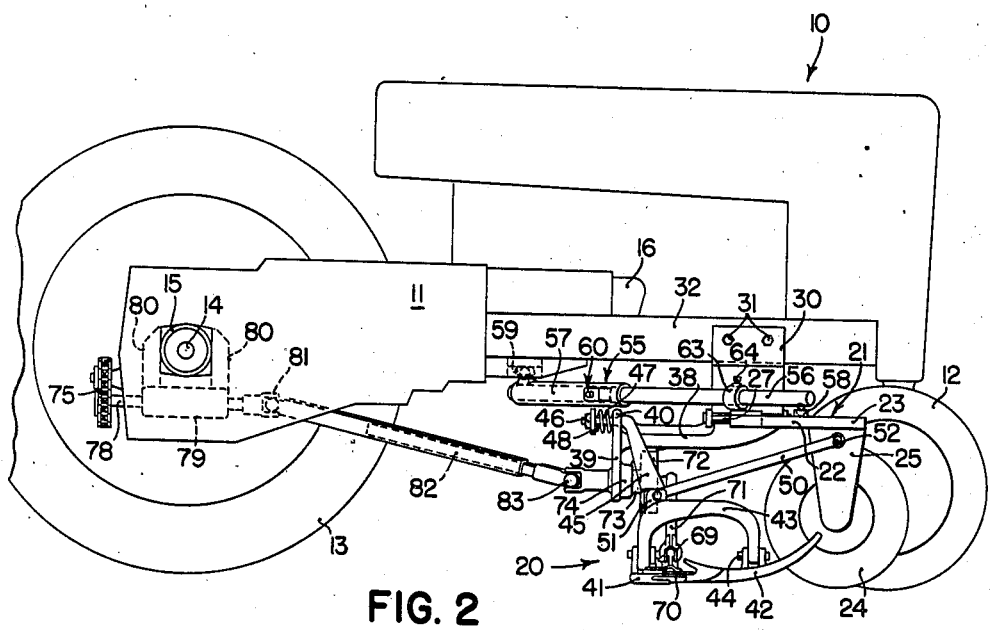
Figure 2 is a side elevational view of the tractor mower.
Figure 3:
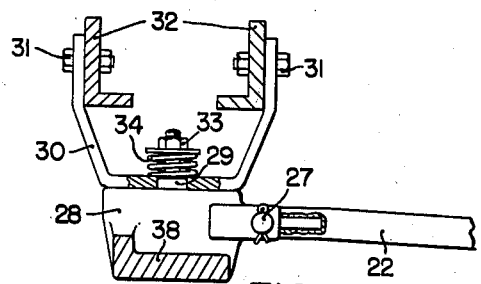
Figure 3 is a sectional elevational view taken along a line 3—3 in Figure 1 and drawn to an enlarged scale.

Referring now to the drawings and more particularly to Figures 1, 2 and 3, the tractor 10 is of the conventional tricycle type having a narrow longitudinally extending body 11 carried on a pair of closely spaced front dirigible wheels 12 and a pair of laterally spaced rear traction wheels 13 mounted on axles 14, which are journaled in axle housings 15, which extend laterally from opposite sides of the rear end of the tractor body 11. The tractor is provided with a conventional engine 16 of the horizontal cylinder type, which is operatively connected to drive the axles 14 and is also connected to drive a power take-off shaft 17 extending rearwardly from the rear end of the body 11 in the usual manner.

The mower, indicated in its entirety by reference numeral 20, comprises a supporting member or frame 21 including a generally horizontally disposed arm 22, which extends laterally from the tractor body 11 and has an outer end portion 23 which bends forwardly. A ground wheel 24 is journaled between a pair of side plates 25 attached to the forward end of the outer portion 23, for supporting the latter. If desired, a conventional caster mounting for this wheel may be used, as shown and described in connection with Figures 4, 5 and 6. A brace 26 extends diagonally inwardly between the outer end of the arm and the intermediate portion, for strengthening the arm 22. The inner end of the arm 22 is swingably connected by a hinge bolt 27 to a pivot block 28, the bolt 27 being disposed generally horizontal and perpendicular to the arm 22, thus providing for vertical swinging movement of the latter in a transverse plane. The hub member 28 is supported by means of a pivot pin 29 on a U-shaped supporting member 30, which is connected at opposite ends by bolts 31 to the longitudinally extending body frame members 32 of the tractor.

The upper end of the pivot pin 29 is reduced in diameter and threaded to receive a nut 33. A coil spring 34 encircles the pin 29 between the nut 33 and the top of the U-shaped member 30. Thus the hub 28 of the mower supporting member 21 is spring mounted on the frame member 30 and is swingable in a horizontal plane about the vertical axis of the pivot pin 29, and also about a generally longitudinally extending axis about the hinge bolt 27, thus permitting the ground wheel 24 to follow the contour of the ground surface over which the tractor mower is operating.

The hub 28 is provided with a rearwardly extending leg 38, the rear end of which is provided with a downwardly extending foot 39 and an upwardly extending lug 40.

The mower 20 also includes a cutter bar 41 of more or less conventional construction, disposed transversely in a position intermediate the front and rear wheels 12, 13 of the tractor and outside of the plane of rotation of the adjacent rear traction wheel 13. The cutter bar 41 is provided with the usual ground engaging shoe 42 fixed to its inner end, and the shoe is supported on a shoe arch 43 by the usual longitudinally extending pivot bolts 44. The shoe arch 43 is fixed at the end of a drag arm 45, which extends inwardly and is provided with a rearwardly turned inner end portion 46, which is inserted through a suitable aperture in the lug 40. A compression spring 47 encircles the rearwardly turned portion 46 and is held under compression between the lug 40 and a washer 48 fixed to the end 46 of the bar or arm 45.

A drag link 50 is pivotally connected to a pair of lugs 51 on the top of the shoe arch 43 for vertical swinging movement relative thereto, and extends forwardly to a pivotal connection at 52 with the wheel supporting fork 25. This drag link 50 transmits draft force from the outer end of the supporting member 22 to the cutter bar during operation, while permitting a vertical floating movement of the cutter bar relative to the supporting frame 22.

The supporting member 22 and the cutter bar 41 are held in normal operating position, indicated at A in Figure 1, by means of a bracing member 55 comprising a bar 56 extending through a sleeve 57 in telescoping relation thereto. The forward end of the bar 56 is connected to the top of the forwardly extending portion 23 of the arm 22 by means of a ball and socket joint 58, and extends rearwardly and inwardly therefrom through the sleeve member 57, which is swingably connected to the bottom of the tractor body 11 by means of a ball and socket joint 59. The two telescoping members 56, 57 are normally secured together by a spring actuated latch 60 including a latch pin 61 extending thorugh a hole in the sleeve 57 and engageable with a recess in the bar 56, and urged toward engaged position by means of a compression spring 62.

During operation in the field, the mower occupies the transversely extending position indicated at A as the tractor moves forwardly. The draft force is transmitted to the cutter bar through the diagonally extending push bar 55 to the arm 22 and from there through the tension link 50 to the shoe arch 43. Should the cutter bar encounter an obstruction, such as a stump, rock or the like, the resistance of the cutter bar to forward motion greatly increases the draft force applied through the telescoping push bar 55, forcing the latter to collapse after the spring detent 60 has yielded to the increased draft force. The collapse of the telescoping member 55 permits the supporting arm 22 and the cutter bar 41 to swing rearwardly about the pivot pin 29 until the cutter bar 41 swings back to a position, indicated at B in Figure 1, adjacent the rear tractor wheel 13. The cutter bar is prevented from striking the wheel 13 by means of a stop collar 63, which encircles the bar 56 and is secured rigidly thereto by means of a set screw 64. When the bar 56 slides through the sleeve 57 during the rearward swinging movement of the cutter bar, the collar 63 engages the forward end of the sleeve 57 just before the cutter bar 41 strikes the wheel 13, thus preventing further rearward swinging movement of the cutter bar. The exact setting of position B can be adjusted by adjusting the collar 63 along the bar 56. The mower can be restored to operating position A by maneuvering the tractor backwards until the latch pin 61 drops into its cooperative recess in the bar 56.

The mower is provided with the usual sickle 70 which reciprocates along the cutter bar 41 and is actuated by means of a more or less conventional pitman rod 71 connected by the usual ball and socket joint 69 to the inner end of the sickle, the opposite end of the pitman 71 being journaled in a conventional manner on a crank pin mounted on a flywheel 72. The flywheel 72 is fixed on a shaft 73, journaled in a bearing 74 at the lower end of the foot 39. Power is transmitted to drive the shaft 73 by means of a chain 75 trained over a pair of sprockets 76, 77 on the rear ends of the power take-off shaft 17 and another shaft 78, respectively. The shaft 78 is journaled in a bearing housing 79, which is mounted on brackets 80 on the front and rear sides of the rear axle housing 15. The shaft 78 extends beneath the housing 15 and is connected through a universal joint 81 to a telescoping connecting shaft 82, which extends forwardly and inwardly and is connected at its forward end through a second universal joint 83 to the flywheel shaft 73. As shown in dotted lines in Figure 1, the telescoping shaft 82 and universal joints 81, 83 maintain the driving connection to the sickle in all positions of the cutter bar.

This disclosure has been simplified by the omission of the usual control levers for raising and lowering the cutter bar 41 about the longitudinal pivot 44, but it is to be understood that any suitable control mechanism known to those skilled in the art can be applied to this mower.

Figure 4:
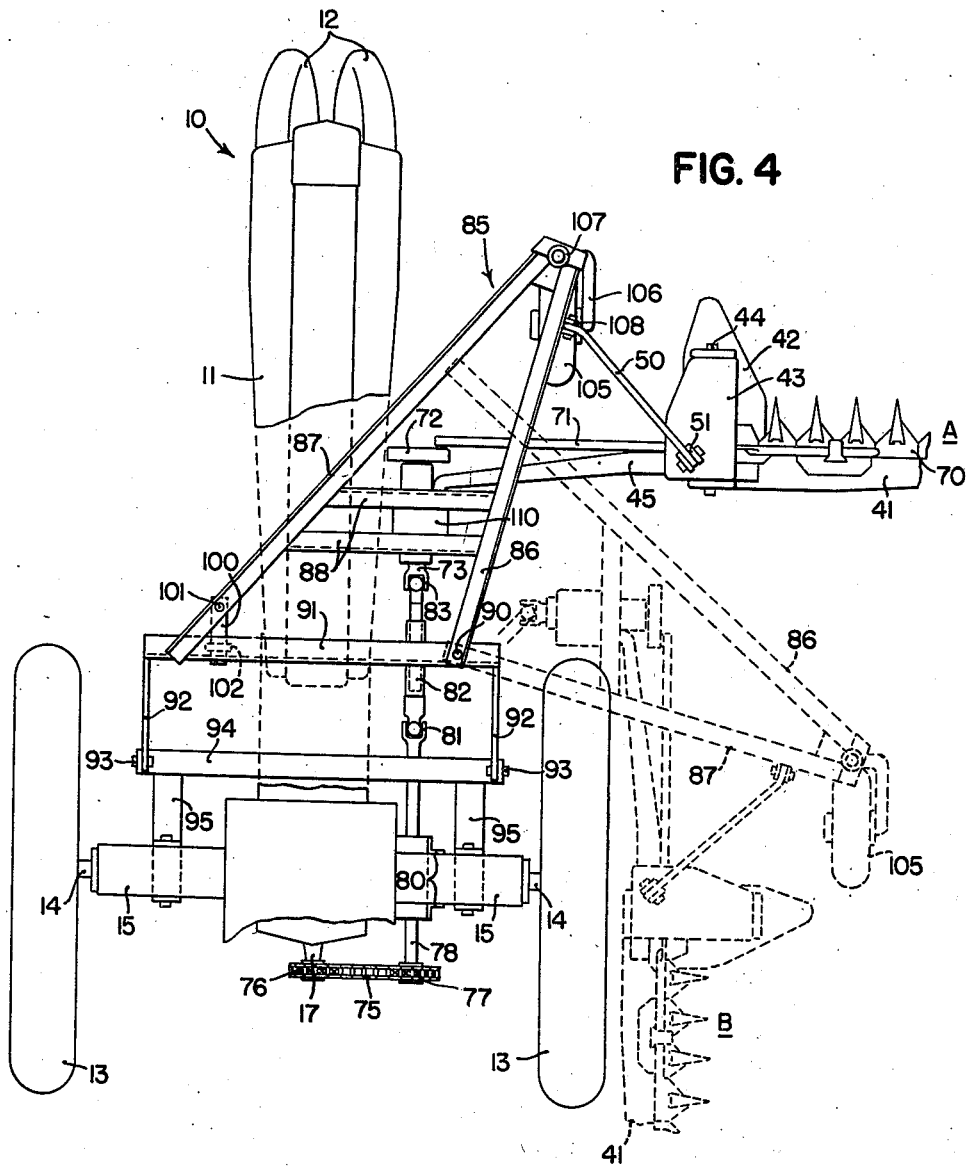
Figure 4 is a plan view of a modified form of our invention.
Figure 5:
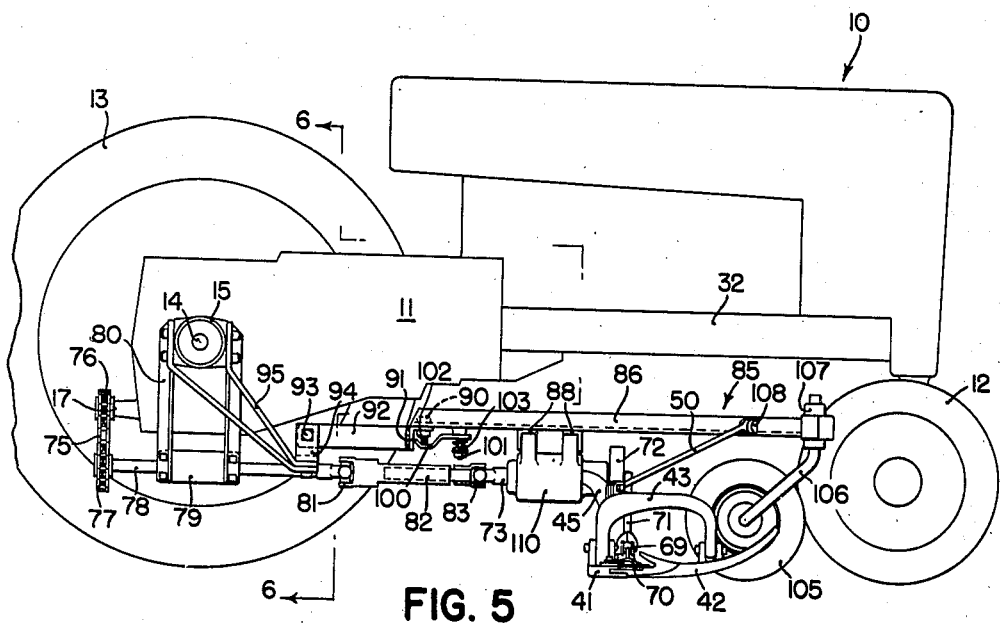
Figure 5 is a side elevational view of the second embodiment.
Figure 6:
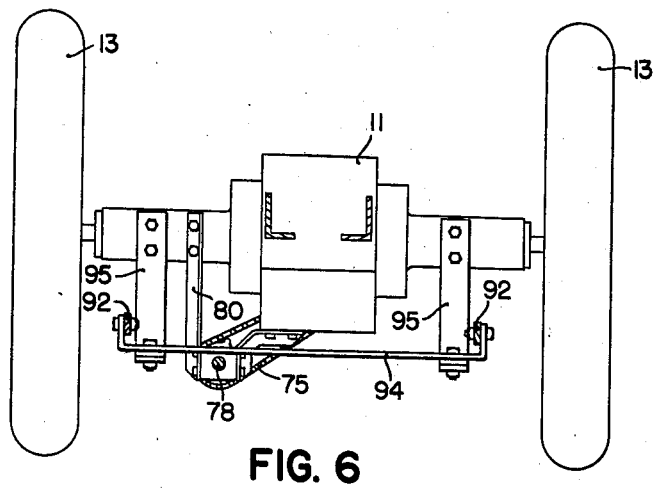
Figure 6 is a sectional elevational view taken along a line 6—6 in Figure 5.

Referring now more particularly to Figures 4, 5 and 6, the cutter bar 41 is mounted on a supporting member, indicated in its entirety by the reference numeral 85, comprising a push bar 86 and a bracing bar 87 disposed in forwardly and laterally converging relation and interconnected by a pair of longitudinally spaced transversely extending members 88 to form a rigid frame. The push bar 86 is pivotally connected by a pin 90 to a transverse U-shaped frame member 91 having a pair of rearwardly extending arms 92 which are connected by a pair of transversely aligned pivot bolts 93 to a transverse bar 94, which is rigidly mounted on the tractor 10 by a pair of supporting brackets 95, which are rigidly bolted to the rear axle housings 15, respectively.

The rear end of the bracing bar 87 rests on top of the transverse U-shaped frame member 91 and is releasably latched thereto by means of a latch tongue 100, which is secured to a bolt 101 on the lower side of the brace bar 87 and hooks under a lug 102 on the lower side of the frame member 91. The latch tongue 100 is urged toward engaged position by means of a compression spring 103 which encircles the bolt 101 and presses against the tongue 100.

The two frame bars 86, 87 are interconnected at their forward ends and are supported on a ground wheel 105 journaled on an arm 106, which is inclined upwardly and forwardly and is journaled in a vertical bearing 107 mounted on the forward end of the supporting frame 85, thus providing a castering action for the supporting wheel 105. When the frame 85 is in normal operating position, the caster wheel 105 is disposed forwardly and substantially in alignment with one of the rear tractor wheels 13, intermediate the front and rear wheels of the tractor.

In this embodiment, the draft link 50 is swingably connected to a securing lug 108 on the side of the frame bar 86, providing for vertical floating movement of the cutter bar 41 with respect to the frame 85.

The cutter bar drag arm 45 is pivotally connected for vertical swinging movement, to a bearing housing 110, which is mounted beneath the transverse frame members 88. The housing 110 also provides a bearing support for the flywheel shaft 73, which is driven through the telescoping power shaft 82 and the universal joints 81, 83, as described in connection with the first embodiment.

During normal operation in the field, the cutter bar is disposed in the transversely extending position indicated at A in Figure 4. The supporting frame 85 is substantially rigid with respect to the U-shaped frame member 91, 92 and is supported at its forward end on the caster wheel 105 which is free to rise and fall with respect to the tractor, in view of the transverse pivot bolts 93 which support the frame member 91. The cutter bar 41 is also free to float vertically to follow the ground contour, by virtue of the swingable draft link 50 and vertically swingable arm 45. Should the cutter bar 41 encounter an obstruction in the field, the increased resistance to forward movement establishes a moment tending to swing the supporting frame 85 about the pivot bolt 90. This stresses the frame bar 87 in tension, which is great enough to overcome the latch spring 103, releasing the latch tongue 100 from the lug 102, permitting the supporting frame 85 and cutter bar 41 to swing rearwardly to position B, in which the cutter bar is disposed in a rearwardly trailing position along the outer side of the adjacent rear tractor wheel 13. After the obstruction is thus cleared, the cutter bar and draft frame can be swung forwardly, either by hand or by maneuvering the tractor rearwardly, and the latch tongue 100 can then be reengaged with the latch lug 102.

We claim:

1. In combination with a tractor having a body mounted on front and rear wheels, a mower comprising a supporting member pivotally mounted on said body intermediate said front and rear wheels for swinging movement relative thereto and having a forwardly extending portion, a ground wheel journaled near the outer end of said portion for supporting the latter, a cutter bar having an arm swingably connected to said member for vertical swinging movement and a draft link connected with said cutter bar and extending forwardly to said forwardly extending portion of the supporting member, and latch means securing said supporting member and cutter bar in normal operating position, said latch means being releasable when the cutter bar encounters an obstruction during operation, permitting said supporting member and cutter bar to swing rearwardly.

2. In combination with a tractor having a body mounted on a pair of laterally spaced rear traction wheels and on centrally disposed front dirigible wheel means, a mower comprising a supporting member pivotally mounted on said tractor body intermediate the front and rear wheels and extending forwardly therefrom, a ground wheel journaled on said member and disposed forwardly of one of said traction wheels and substantially in fore and aft alignment therewith, a cutter bar disposed transversely of said tractor in normal operating position and outside of said ground and traction wheels and having a supporting link extending inwardly and swingably connected to the inner portion of said supporting member for vertical swinging movement, and a draft link connected with said cutter bar and swingably coupled to the outer end of said supporting member providing for said vertical swinging movement relative thereto, and releasable means for holding said member and said cutter bar against swinging movement out of said normal operating position.

3. In combination with a tractor having a body mounted on front and rear wheels, a mower comprising a supporting arm pivotally mounted on said tractor body ahead of said rear wheels for swinging movement about a generally vertical axis, said arm extending forwardly and laterally therefrom, a ground wheel journaled on said arm for supporting the same, a cutter bar having a supporting link extending inwardly and swingably connected to the inner portion of said supporting member for vertical swinging movement, and a draft link connected with said cutter bar and swingably coupled to the outer end of said supporting member providing for said vertical swinging movement relative thereto, and swingable therewith about said vertical axis, and a second arm serving as a brace between said arm and the tractor body to hold said arm and cutter bar in normal operating position, said bracing arm being releasable to permit said cutter bar to swing rearwardly from normal position.

4. In combination with a tractor having a body mounted on a pair of laterally spaced rear traction wheels and on centrally disposed front dirigible wheel means, a mower comprising a supporting arm pivotally mounted on said tractor body behind said front wheel means by means providing for swinging movement in a generally horizontal plane and for vertical movement in a transverse plane, a ground wheel journaled on said arm and spaced laterally of said front wheel means and forwardly of one of said rear wheels, a cutter bar connected with said arm by means providing for vertical floating movement relative thereto and extending laterally therefrom outside the plane of said rear wheel and swingable rearwardly with said arm to a trailing position adjacent said rear wheel, and releasable latch means between said body and said arm for holding the latter against rearward swinging movement relative thereto.

5. In combination with a tractor having a body mounted on front and rear wheels, a mower comprising a supporting member pivotally mounted on the tractor body on a generally vertical axis, a supporting arm hinged to said member for vertical swinging movement relative thereto, a ground wheel for supporting the outer end of said arm, a cutter bar disposed behind said arm and laterally outwardly thereof, a draft link connecting said arm with said cutter bar, a second arm swingably connecting said cutter bar and said supporting member, and a releasable bracing connection between said wheel supported arm and said tractor body to normally hold said mower in operating position.

6. In combination with a tractor having a body mounted on front and rear wheels, a mower comprising a supporting member pivotally mounted on the tractor body on a generally vertical axis, a supporting arm hinged to said member for vertical swinging movement relative thereto, a ground wheel for supporting the outer end of said arm, a cutter bar disposed behind said arm and laterally outwardly thereof, a draft link connecting said arm with said cutter bar, a second arm swingably connecting said cutter bar and said supporting member, and a releasable bracing connection between said wheel supported arm and said tractor body to normally hold said mower in operating position, said bracing connection comprising a pair of telescoping members and a spring actuated detent securing said members against relative movement but releasable when the cutter bar encounters an obstruction during operation to permit said arm and cutter bar to swing rearwardly.

7. In combination with a tractor having a body mounted on front and rear wheels, a mower comprising a supporting arm pivotally mounted on said tractor body ahead of said rear wheels for swinging movement about a generally vertical axis, said arm extending forwardly and laterally therefrom, a ground wheel journaled on said arm for supporting the same, a cutter bar having a supporting link extending inwardly and swingably connected to the inner portion of said supporting member for vertical swinging movement, and a draft link connected with said cutter bar and swingably coupled to the outer end of said supporting member providing for said vertical swinging movement relative thereto, and swingable therewith about said vertical axis, and a bracing member swingably connected with said arm and extending rearwardly and inwardly and pivotally connected with the tractor body to hold said arm and cutter bar in normal operating position, said bracing member comprising a pair of telescoping members and a spring actuated detent securing said members against relative movement but releasable when the cutter bar encounters an obstruction during operation to permit said arm and cutter bar to swing rearwardly, and limit stops on said telescoping members to limit the relative movement therebetween to prevent the cutter bar from striking the rear tractor wheel.

8. In combination with a tractor having a body mounted on front and rear wheels, a mower comprising a supporting member swingably mounted on said tractor body intermediate the front and rear wheels for swinging movement relative thereto and extending forwardly and laterally therefrom, a castering supporting wheel mounted near the outer end of said member, a cutter bar disposed rearwardly of said member and extending laterally therefrom in normal operating position, swingable draft link means connecting said cutter bar to said supporting member providing for vertical floating movement relative thereto, and releasable means for holding said member and cutter bar in said normal operating position but releasable responsive to an abnormal resistance of said cutter bar to forward movement, whereby the latter and said member are free to swing rearwardly on said caster wheel support.

9. In combination with a tractor having a body mounted on front and rear wheels, a mower comprising a supporting member comprising a pair of forwardly and laterally converging bars connected together at their outer ends, ground engaging wheel means carrying the forward ends of said converging bars, means pivotally connecting the rear end of one of said bars to the tractor body, and releasable latch means connecting the rear end of the other of said bars with the tractor body, and a cutter bar mounted on said supporting member.

10. In combination with a tractor having a body mounted on front and rear wheels, a mower comprising a supporting member comprising a pair of forwardly and laterally converging bars connected together at their outer ends, a castering wheel mounted at the forward ends of said converging bars, means pivotally connecting the rear end of one of said bars to the tractor body, and releasable latch means connecting the rear end of the other of said bars with the tractor body, a transversely disposed cutter bar mounted on said supporting member and swingable therewith from a transverse operating position to a trailing position outside one of said rear tractor wheels and substantially parallel thereto, upon release of said latch means.

11. In combination with a tractor having a body mounted on front and rear wheels, a mower comprising a transverse frame member pivotally connected to the tractor body for angular movement about a transverse axis, a pair of forwardly and laterally converging bars beneath the tractor body, one of said bars being pivoted to said frame member for swinging movement about a generally vertical axis, releasable latch means connecting the other bar adjacent the opposite side of said transverse frame member, a ground engaging support at the forward ends of said converging bars, a transverse cutter bar adjacent the forward end of said bars, and means including a draft link connecting said cutter bar with said converging bars.

12. In combination with a tractor having a body mounted on front and rear wheels, a mower comprising a U-shaped transverse frame member swingably mounted on the tractor body for vertical movement relative thereto and extending forwardly adjacent the forward portions of said rear wheels, a bar pivotally connected to said frame member at one end thereof adjacent one of said wheels and swingable laterally in front of the latter from a normally forwardly extending position to a transverse position, a caster wheel mounted at the outer end of said bar for carrying the latter, a normally transversely extending cutter bar mounted on said wheel supported bar and swingable therewith rearwardly to a trailing position along the outer side of said rear wheel, and a bracing arm connected with said wheel supported bar and releasably connected with said transverse frame member at a point spaced laterally from the bar pivot means, for normally holding said bar and cutter bar in normal operating position.

13. In combination with a tractor having a body mounted on front and rear wheels, a mower comprising a bar pivotally connected to said tractor body adjacent one of said rear wheels and swingable laterally in front of the latter from a normally forwardly extending operating position to a transverse position, ground engaging means for supporting the forward end of said bar, a normally transversely extending cutter bar mounted on said wheel supported bar and swingable therewith to a trailing position outside said rear wheel, and a releasable connecting member extending from the opposite side of said tractor to said pivoted bar adjacent the outer end thereof, for normally holding the cutter bar in operating position.

14. In combination with a tractor having a rear wheel, a mower comprising a mower frame pivoted to the tractor ahead of and inwardly of said rear wheel, a cutter bar assembly connected to and extending laterally from said mower frame and disposed forwardly from the point of pivotal connection of the mower frame with the tractor at least as far as said point is inwardly of the outer side of said wheel, whereby said cutter bar is capable of swinging rearwardly into a position approximately parallel to said rear wheel and a ground engaging supporting wheel journaled on said mower frame.

NOLAN D. COLVIN.
CARL J. FREDERIKSEN.